United States Patent
Frait et al.

(10) Patent No.: US 8,612,323 B1
(45) Date of Patent: Dec. 17, 2013

(54) METHODS AND SYSTEMS FOR TRADE FEE AND REBATE COMPUTATION AND ORDER ROUTING

(75) Inventors: Eric Frait, Naperville, IL (US); Eileen C. Smith, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

(21) Appl. No.: 13/491,338

(22) Filed: Jun. 7, 2012

(51) Int. Cl.
*G06Q 40/04* (2012.01)

(52) U.S. Cl.
USPC ............ 705/35; 705/36 R; 705/37; 705/14.34

(58) Field of Classification Search
CPC ....................................................... G06Q 40/04
USPC ................. 705/35, 36 R, 37, 14.34
See application file for complete search history.

(56) References Cited

U.S. PATENT DOCUMENTS

| | | | |
|---|---|---|---|
| 6,236,972 B1 * | 5/2001 | Shkedy | 705/26.1 |
| 6,321,212 B1 * | 11/2001 | Lange | 705/36 R |
| 6,882,985 B1 * | 4/2005 | Kay et al. | 705/37 |
| 7,246,093 B1 | 7/2007 | Katz | |
| 2002/0099640 A1 * | 7/2002 | Lange | 705/37 |
| 2004/0088242 A1 * | 5/2004 | Ascher et al. | 705/37 |
| 2007/0073608 A1 * | 3/2007 | Garcia | 705/37 |
| 2010/0082495 A1 | 4/2010 | Lutnick et al. | |
| 2010/0191640 A1 | 7/2010 | Tilly et al. | |
| 2011/0071936 A1 | 3/2011 | Reed | |

OTHER PUBLICATIONS

Hinze, John, Will high frequency traders be obliged to trade?, Jun. 21, 2010, Securities Industry News.*
C2 Options Exchange, Incorporated Fees Schedule, dated Jun. 1, 2012 (7 pages).
Chicago Board Options Exchange, Incorporated Fees Schedule, dated Jun. 1, 2012 (19 pages).
CBOE Stock Exchange (CBSX) Fees Schedule, dated Jun. 1, 2012 (3 pages).

(Continued)

*Primary Examiner* — Narayanswamy Subramanian
*Assistant Examiner* — Carol See
(74) *Attorney, Agent, or Firm* — Brinks Gilson & Lione

(57) ABSTRACT

Systems and methods for determining a trade fee charged by a trading venue to a market participant, or a rebate credited by a trading venue to a market participant are disclosed. The method may include a computer accessing and storing one or more order information parameters in memory, as well as accessing and storing one or more of market characteristics in memory. The method may further include calculating a trade fee or rebate that is based on at least one of the order information parameters and at least one of the market characteristics stored in memory. A system may include a memory containing instructions for calculating a trade fee or rebate and a processor in communication with the memory, the processor configured to execute the instructions according to the method set out above.

11 Claims, 4 Drawing Sheets

(56) References Cited

OTHER PUBLICATIONS

CFE Fee Schedule, dated May 23, 2012 (5 pages).
International Securities Exchange Schedule of Fees, dated Jun. 1, 2012 (24 pages).
NYSE Amex Options Fee Schedule, dated Jun. 1, 2012 (12 pages).
"Maker-Taker", *MarketsWiki*, last modified on Apr. 30, 2010, Obtained from the Internet on Sep. 15, 2010 at: http://www.marketswiki.com/mwiki/Maker-taker (1 page).
Mehta, Nina, "Options Maker-Taker Markets Gain Steam", *Traders Magazine*, dated Oct. 2007, Obtained from the Internet on Sep. 15, 2010 at: http://www.tradersmagazine.com/issues/20071004/2933-1.html (5 pages).
Office Action issued in U.S. Appl. No. 12/883,048, mailed on Jul. 3, 2012 (9 pages).
Office Action issued in U.S. Appl. No. 12/883,048, mailed on Jan. 22, 2013 (14 pages).

\* cited by examiner

METHODS AND SYSTEMS FOR TRADE FEE AND REBATE COMPUTATION AND ORDER ROUTING

FIELD OF THE DISCLOSURE

The present disclosure relates generally to the trading of financial products. More specifically, the present disclosure relates to the calculation of trade fees charged and rebates granted by trade venues for the execution of financial product orders.

BACKGROUND

A trade venue is a location (either physical, virtual, or some combination of the two) where items, such as financial products, are bought and sold. Examples of trade venues include: stock exchanges, options exchanges, futures exchanges, and swap execution facilities. Financial products include, but are not limited to, securities, currencies, futures contracts, swap contracts, and options contracts. Trade venues that provide for the exchange of financial products (e.g., options exchanges) compete for order flow and an overall higher share of the order volume (i.e., liquidity) in the market. This competition for order volume has led trade venues to institute various features in an effort to gain competitive edge.

For example, historically the trading of financial products at trading venues was conducted through a process known as open-outcry trading. In open-outcry trading, market participants typically communicate verbally and/or visually with each other to indicate their willingness to buy and sell financial products. However, more recently some trade venues have been established that have no open-outcry trading, and instead trading is conducted through purely computer facilitated electronic communication. In these electronic exchanges market participants utilize computer based systems to transmit messages (e.g., quotes and/or orders) to conduct trading. Still other trade venues use a hybrid trading system that combines the features of open-outcry and electronic trading in a single exchange. The implementation of these different market models of trading is one way in which the trade venues have attempted to find competitive advantage and gain a greater share of liquidity.

Additionally, trade venues compete with each other for order volume through the use of, inter alia, trade fees and rebates. Trade fees are the fees charged by a trade venue to the market participants for executing an order. Rebates are incentives paid out by a trade venue to market participants for executing orders at a trade venue. Trade fees and rebates are analyzed by market participants when deciding to which trade venues to send order flow.

Several different types of trade fee and rebate structures are currently in use or have been used by trade venues. For example, some known fee structures include straight trade fee schedules, traditional trade fee schedules, and maker/taker trade fee schedules. According to a straight trade fee schedule, each market participant pays the same predefined trade fee for each trade executed at a trade venue.

According to a traditional trade fee schedule, each market participant pays a predefined trade fee for each order executed at the trade venue based on one or more properties of the order or the market participant. For example, trade fees may be set in a traditional trade fee schedule according to one or more of the following list, including but not limited to: the type of order (e.g., market maker, customer, professional, broker-dealer, etc.); the type of financial product (e.g., equity option contract, index option contract, future contracts, etc.); the symbol of a financial product (the trade fee for one equity option may be set higher than the trade fee for another equity option); the type of execution (e.g., open-outcry or electronic); and the cumulative volume of trades executed by a market participant.

Maker/taker trade fee schedules generally give a rebate to market participants that provide liquidity (i.e., "makers"), and charge a trade fee to market participants that take liquidity out of the market (i.e., "takers"). Thus, the maker/taker trade fee schedule differs from the straight and traditional trade fee schedules because under the maker/taker schedule only the "taker" pays a trade fee. However, in some implementations of a maker/taker fee schedule it is the "maker" that pays the fee and the "taker" that is given the rebate. While the determination of which order is the "maker" and which is the "taker" can be made in a number of different ways, it is possible to make the determinations based on the "book time" of the orders. More specifically, the order with the earlier book time is generally the "maker".

One common feature of the prior art straight, traditional, and maker/taker trade fee schedules is that they are all predefined static schedules, which are incapable of accounting for the dynamic nature of the market.

BRIEF SUMMARY

Accordingly, the present disclosure describes methods and systems for calculating a dynamic trade fee or rebate schedule in real-time that accounts for ever-changing market characteristics. Additionally, the present disclosure describes systems and methods that route and execute orders based on calculated actual or estimated dynamic trade or rebate fees.

According to a first aspect, a computer-implemented method for calculating dynamic trade fees is described. The method includes a computer accessing order information having order information parameters and storing one or more of the order information parameters in memory. The method further includes the computer accessing one or more market characteristics and storing one or more of the market characteristics in memory. The computer then calculates a trade fee that is based on at least one of the order information parameters and at least one of the market characteristics stored in memory. The one or more order information parameters may include symbol, strike price, expiration, type, side, order size, order price, contingency, user identification, origin code, execution time, execution size, execution price or book time. The one or more market characteristics may include at least one of bid and ask information, last price, market spread, order volume, volatility, or market direction.

According to another aspect a system for calculating dynamic trade fees is disclosed. The system comprising may include at least one memory containing instructions for calculating a dynamic trade fee. The system further includes a processor in communication with the at least one memory that is configured to execute the instructions to access order information having order information parameters, store one or more of the order information parameters in the at least one memory, access one or more market characteristics, store one or more of the market characteristics in the at least one memory, and calculate a trade fee that is based on at least one of the order information parameters and at least one of the market characteristics stored in the at least one memory.

In yet another aspect, a computer-implemented method for calculating dynamic rebates includes, by a computer, accessing order information having order information parameters and storing one or more of the order information parameters in memory. The method further includes the computer also accessing one or more market characteristics and storing one or more of the market characteristics in memory. The computer then calculates a rebate that is based on at least one of the order information parameters and at least one of the market characteristics stored in memory.

The above and/or other aspects, features and/or advantages of various embodiments will be further appreciated in view of the following description in conjunction with the accompanying figures. Various embodiments can include or exclude different aspects, features, or advantages where applicable. In addition, various embodiments can combine one or more aspects, features, or advantages where applicable. The descriptions of the aspects, features, or advantages of a particular embodiment should not be construed as limiting any other embodiment of the claimed invention.

BRIEF DESCRIPTION OF THE DRAWINGS

The accompanying figures are provided by way of example, without limiting the broad scope of the invention or various other embodiments, wherein.

DETAILED DESCRIPTION OF THE DRAWINGS

According to the present invention, computerized systems and computer implemented methods are disclosed that allow for the periodic or real-time calculation of actual or estimated/predicted dynamic trade fees and/or rebates that are based on, at least in part, market characteristics (e.g., market spread). According to an embodiment of the present invention, the periodic or real-time calculation is performed at a trade venue as part of the order execution or post-order execution processes. According to another embodiment of the present invention, the periodic or real-time calculation is performed prior to execution by financial systems that are external to a trade venue (e.g., smart routers, order management systems, execution management systems, algorithmic trading systems, etc.).

Embodiments of the present invention may be integrated into known trade venue computer architecture and/or into known financial systems that are external to a trade venue. For example, embodiments of the present invention could be implemented using the trade venue architecture shown in FIG. 1.

Figure 1:
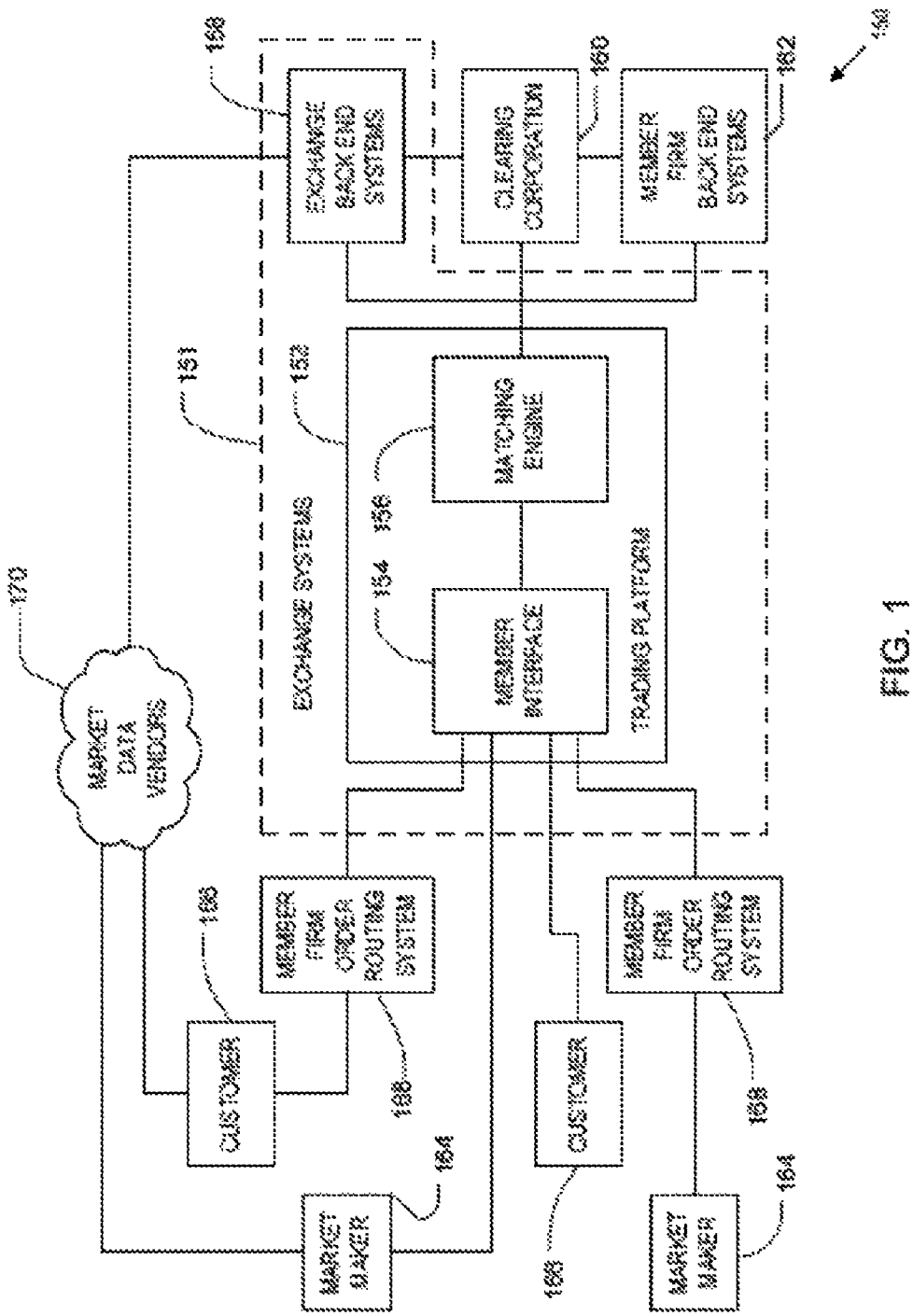
FIG. 1 is a network diagram of an exemplary trade venue system.

FIG. 1 shows an exemplary trade venue system 150 in the form of a financial exchange, such as the Chicago Board Options Exchange, Incorporated (CBOE). Trade venue system 150 includes financial exchange components, as well as components operated by non-exchange entities that access the financial exchange. The financial exchange components are shown within the dashed lines 151. Components outside the dashed lines are operated by non-exchange entities. The various components of trade venue system 150 are made up of a combination of computer hardware (i.e., computer processors, memory, storage, input/output devices, etc.) and software. Electronic communications within financial trading system 150 may be achieved using a variety of known mediums, including, but not limited to: LANs, WANs, and the Internet.

The exchange components of the trade venue system 150 include a computer implemented trading platform 152 (that includes, but is not limited to, member interface 154 and matching engine 156) and computer implemented exchange back-end systems 158. Member interface 154 provides an electronic interface for receiving messages (e.g., bids, offers, quotes, orders, and trading instructions) from the computers or other electronic devices of traders or other entities transacting business at the financial exchange, or any combination thereof. The member interface 154 may be a graphical user interface (GUI) or an application programming interface (API) and other software components operating on a computer configured to perform trading functionality. Additionally, according to the trade venue system 150, the member interface 154 analyzes received electronic trading instructions for proper format and information, and, if deemed execution eligible, routes the trading instruction to the appropriate matching engine 156.

Matching engine 156 provides an electronic mechanism for matching contra-position bids and offers that are submitted to the trade venue by market participants. While trade venue system 150 shows a single matching engine 156, multiple matching engines may be included in a trading platform 152. Multiple matching engines may work independently or cooperatively depending on various factors related to the business of the trade venue. For example, different exchange traded products (e.g., stock, futures contracts, options contracts, symbols, etc.) may utilize different matching engines. The matching engine 156 executes trades by pairing contra orders. Further, according to some financial trading systems, non-marketable orders are placed in an electronic order book. An electronic order book may be implemented using known computer hardware in combination with a database product. According to some implementations of trade venue systems, a book time is recorded when an order enters the order book.

After a trade is executed, matching engine 156 sends information related to the executed trade to the exchange back-end systems 158, which further process trades that have been executed at the financial exchange. According to an embodiment of the present invention, the exchange back-end systems 158 include electronic storage hardware and software (e.g., database software) that is used to store order and trade data and/or records. The matching engine 156 sends information related to the executed trade to the member firm back-end systems 162. According to some examples of financial trading systems, the matching engine 156 also updates the electronic order book based on executed transactions.

The non-exchange components of trade venue system 150 include clearing corporation systems 160, and member firm back-end systems 162. The clearing corporation systems 160 are used in the process of settling trades that have been executed at the financial exchange. An example of a clearing corporation is OCC, which is a derivatives clearing organization. The member firm back-end systems 162 are used by the entities conducting business at the financial exchange to receive settlement information regarding their transactions.

According to the present exemplary trade venue system 150, the computer implemented trading platform 152 can be accessed in a variety of ways by market participants conducting business at the financial exchange. For example, market makers may access the computer implemented trading platform 152 through market maker computers 164 that are in electronic communication with the member interface 154. Utilizing the market maker computers, electronic messages (e.g., bids, offers, quotes, orders, and/or other trading instructions) may be sent to the computer implemented trading platform 152. Alternatively, the electronic messages may be routed through a member firm order routing system 168.

Further, according to the present exemplary financial trading system, a non-member market participant wanting to transact business at the trade venue can enter an order using a customer computer 166. However, such orders must be routed through a member firm order routing system 168. The member firms order routing systems 168 transmits the electronic trading instructions to the member interface 154.

The exchange back-end systems 158 may, according to some implementations of trade venue systems, perform a number of functions. For example, exchange back-end systems 158 may perform operations related to contract definitions, listing data, billing, and storage of order and trade data and/or records. According to an embodiment of the present invention, the exchange back-end systems 158 include electronic storage hardware and software (e.g., database software) that stores trade records and other information (e.g., trade fee and rebate variables). Additionally, the exchange back-end systems may transmit information to market data vendors 170, perform operations related to the performance of underlying assets for derivative financial products, determine appropriate contract settlement values, and supply final settlement data to the clearing corporation systems 160 and the member firm back-end systems 162.

According to an embodiment of the present invention, the exchange back-end systems 158 are configured to calculate (in real-time, near real-time, or periodically) a dynamic trade fee and/or rebate that accounts for market characteristics (e.g., market spread). According to an embodiment of the present invention, the exchange back-end systems 158 include one or more databases that store parameters for calculating trade fees and/or rebates. According to another embodiment of the present invention, the parameters for calculating trade fees and rebates are encoded in computer readable instructions that when processed by one or more trade venue computers allow for the calculating of trade fees and rebates. Further, the back-end systems 158 include electronic communication capabilities for transmitting calculated trade fees and rebates to the market participants. According to another embodiment of the present invention, trade venue systems other than the back-end systems 158 include electronic communication capabilities for transmitting calculated trade fees and rebates to the market participants. For example, a trade venue's front-end systems may be configured to transmit calculated trade fees and rebates to market participants as part of trade fill reports that are generated after the execution of a trade.

According to the present invention, a trade fee calculation for the execution of an order is based, at least in part, on one or more order information parameters and one or more market characteristics. According to an embodiment of the present invention, the trade fee calculation may also be based on one or more market participant characteristics.

In the present disclosure, an order information parameter is a piece of information that is related to or can be obtained from an order submitted by a market participant or a trade record generated by the execution of the submitted order against a contra-order or contra-quote. According to an embodiment of the present invention, order information parameters may include information about an order, contra-order, contra-quote, or trade execution.

For example, order information parameters for an option contract include, but are not limited to symbol; strike price; expiration date; type of contract (i.e., call or put); side (i.e., buy or sell); order size (i.e., the number of a financial product to be bought or sold); order price (e.g., a limit price or market); order contingency (e.g., restrictions on order such as: good-till-cancel, day, immediate or cancel, etc.); order user identification (i.e., who submitted the order); order origin code (i.e., what type of client the order was submitted for, such as: customer, broker-dealer, market maker, etc.); order book time; contra side; contra user identification; contra quote size; contra quote time; execution time; estimated execution price; execution size; and execution price. Orders for other types of financial products (e.g., stock and futures) may include different order information parameters (e.g., orders executed at an alternative trading system (ATS) may have order information parameters including, but not limited to: contra order side; contra order user identification; contra order size; contra order time; etc.). Additionally, order information parameters regarding an order may be obtained before or after the order is executed. According to the present invention, a determination of and whether an order is a "maker" or "taker" is an order information parameter.

In the present disclosure, a market characteristic is a non-static piece of information that is related to market behavior at a trade venue to which an order has been or is contemplated being sent. At a trade venue, market characteristics can be accessed from internal market data communications. At a financial system that is external to a trade venue, market characteristics can be accessed from commercially available market data feeds.

Market characteristics include, but are not limited to: execution volume at a trade venue (e.g., total execution volume at a trade venue or a subset of the execution volume at a trade venue according, for example, to one or more symbols); market spread (i.e., the distance between the bid and ask at a trade venue or venues, e.g., the best bid and offer (BBO) or national best bid and offer (NBBO)) for one or more financial products; midpoint of the market spread; movement direction for the price of a financial product (i.e., is the price of a financial product on average increasing or decreasing); and volatility in a financial instrument. According to an embodiment of the present invention, market characteristics can be observed in real-time, near real-time and/or periodically. Additionally, historical market characteristics can be utilized by financial trading systems in performing data analysis, for example the calculation of trade fee estimates/predictions.

In the present disclosure, a market participant characteristic is a piece of information that is specific to a market participant but is not specific to an order. Market participant information can include information that is static or dynamic. For example, according to an embodiment of the present invention, the market participant data could include total order volume submitted by a particular market participant at a trade venue and order volume submitted in a particular financial product or subset of financial products at a trade venue.

According to an embodiment of the present invention, one or more order information parameters may be used to determine which market characteristics and market participant characteristics should be used in calculating a trade fee or rebate. For example, a trade venue may list hundreds or thousands of different financial products for trading. According to an embodiment of the present invention, if a market spread (which is a market characteristic) for a particular execution wanted to be accessed, it would necessitate the use of several order information parameters, including: symbol, strike price, expiration, and execution time.

Figure 2:
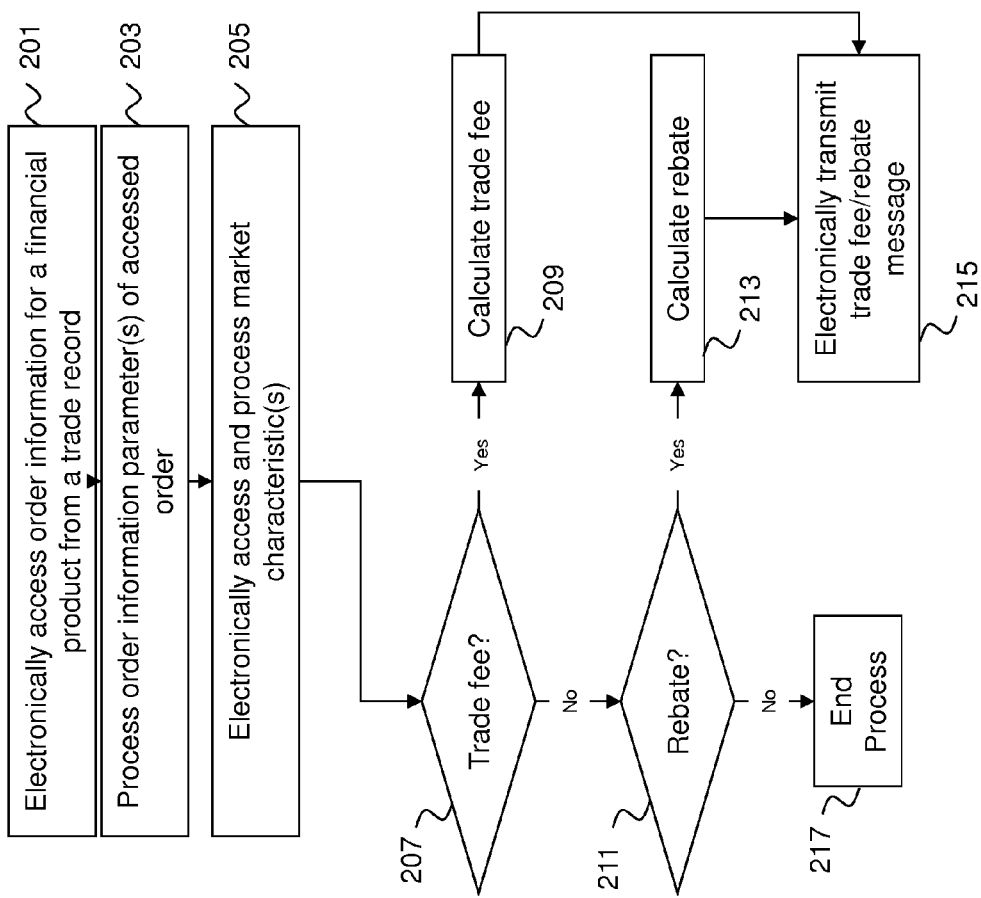
FIG. 2 is a flow diagram of the steps taken by a trade venue system to calculate a trade fee or rebate according to an embodiment of the present invention.

FIG. 2 is a flow diagram of the steps a system would take in calculating a dynamic trade fee and/or rebate. Specifically, FIG. 2 contemplates that the process would take place on a trade venue system (e.g., the system set in FIG. 1 and described above). However, according to an embodiment of the present invention, the process of FIG. 2 could be minimally altered to provide for calculation of a dynamic trade fee and/or rebate at a financial system that is external to any trade venue (e.g., a smart router or algorithmic trading system).

At step 201, order information for a financial product is accessed electronically. According to various embodiments of the present invention, this step could be performed by retrieving order information from random access memory (RAM), by querying a database and retrieving order information, or through some other form of electronic accessing. According to an embodiment of the present invention, the order information may be accessed from order records, trade records, and/or during the process of receiving and/or executing an order.

According to various embodiments of the present invention, this step could take place before, during, or after execution of an order. The order information includes at least one order information parameter, as described above.

For example, step 201 could include the accessing of a trade record (shown below) that was generated when an option order was submitted and executed at a trade venue (e.g., CBOE).

| Option Information: | |
| --- | --- |
| Symbol = IBM | Strike Price = 200 |
| Expiration = Oct. 20, 2012 | Type = Call |
| Order: | Contra-Quote: |
| Side = Buy | Side = Sell |
| Order Price = $5 | User identification = ABC |
| User identification = XYZ | Quote Size = 20 |
| Order Size = 11 | Quote Time = 14:45 |
| Contingency = Day | |
| Origin Code = Customer | |
| Book Time = 14:30 | |
| Execution Information: | |
| Execution Time: 14:45 | Execution Price: $5 |
| Execution Size: 11 | |

At step 201, some or all of the order information parameters listed in the trade record are retrieved from memory by a computer processor.

At step 203, one or more order information parameters of the accessed order information are processed. According to an embodiment of the present invention, at step 203, particular order information parameters may be loaded into memory for future use in the calculation of a dynamic trade fee or rebate.

At step 205, one or more market characteristics are electronically accessed and processed. According to an embodiment of the present invention, at step 205, particular market characteristics may be loaded into memory for use in the calculation of a trade fee or rebate. According to the present invention one or more order information parameters can be used to obtain a market characteristic For example, if a market spread (which is a market characteristic) for a particular execution (or contemplated execution) had to be accessed, it would necessitate the use of several order information parameters, including: symbol, strike price, expiration, and execution time (no execution time would be used for a contemplated execution). At step 207, it is determined if a trade fee needs to be calculated for the executed order. According to an embodiment of the present invention, the determination is made based on one or more of the order information parameters. According to another embodiment of the present invention, the determination may also be made based on one or more market characteristics and/or market participant characteristics. For example, a trade fee structure may be set such that customer "maker" orders pay a trade fee, while customer "taker" orders do not. Thus, if the accessed order was a customer "maker" order, step 207 would yield a determination that a trade fee needs to be calculated.

For example, according to an embodiment of the present invention, the origin code of the order is used to determine if the order is a market maker, professional, or customer order. However, there are numerous other origin codes that could be available including, but not limited to: broker-dealer; away market maker; firm proprietary; and underlying stock specialist.

According to an embodiment of the present invention, market maker and professional orders are subjected to a trade fee. Further, according to an embodiment, customer "makers" are subjected to a trade fee and customer "takers" are given a rebate. It should be noted the different implementations of fee schedules may charge trade fees or give rebates based on any number of order information parameters, market characteristics, and/or market participant characteristics. The examples discussed herein are not intended to and do not limit the scope of the present invention.

Continuing the example started above, the origin code indicates that the order is a customer order and thus, according to an embodiment of the present invention, a determination must be made as to if the order is a "maker" or "taker". This determination may be conducted, according to an embodiment of the present invention, by comparing the book time of the order and the book time of the contra-quote or order (i.e., the quote or order executed against the accessed order). In the present example the contra-quote was submitted at 14:45, 15 minutes after the book time of the buy order. Thus, in this example the customer buy order is the "maker" order and subject to a trade fee. According to another embodiment of the present invention, the determination of may be conducted by comparing the book time of an order and the execution time. If the book time was prior to the execution time then the order was a "maker" order. If the book time (or a submission time if the order was not booked) is equal to or substantially equal to the execution time, then the order was a "taker" order. Additionally, the "maker"/"taker" determination could be made in a different way.

At step 209 a trade fee is calculated. As described in further detail below, the trade fee can be calculated according to numerous configurations so long as one of the inputs is a non-static market characteristic (e.g., market spread).

If at step 207 it is determined that no trade fee need be calculated the process continues at step 211. At step 211, it is determined if a rebate needs to be calculated for the executed order. If it is determined that no rebate need be calculated, the process ends at step 217. However, if it is determined that a rebate needs to be calculated, the process continues at step 213. For example, according to an embodiment of the present invention, an order that is a customer "taker" order would receive a rebate and thus a rebate would need to be calculated.

At step 213 a rebate is calculated. As described in further detail below, the rebate can be calculated according to numerous configurations so long as one of the inputs is a non-static market characteristic, e.g., market spread.

After the trade fee or rebate is calculated an electronic trade fee or rebate message is transmitted at step 215. According to an embodiment of the present invention, the message may be sent to a database, a billing system, and/or a market participant. The trade fee or rebate message may include any number of parameters including, but not limited to, user identification, origin code, order execution time, trade fee or rebate amount, etc.

According to an embodiment of the present invention, a financial system that is external to a trade venue uses a calculated actual or estimated trade fee/rebate to determine where and when to route orders. For example, a smart router system (i.e., a computer system that decides to which trade venues orders should be routed for execution) may calculate estimated/predicted trade fees and rebates when determining to which trade venue an order should be sent. Additionally, other financial trading systems (e.g., computerized algorithmic trading systems) may calculate estimated/predicted trade fees and rebates when determining if orders should be created and sent to a particular trade venue.

Figure 3:
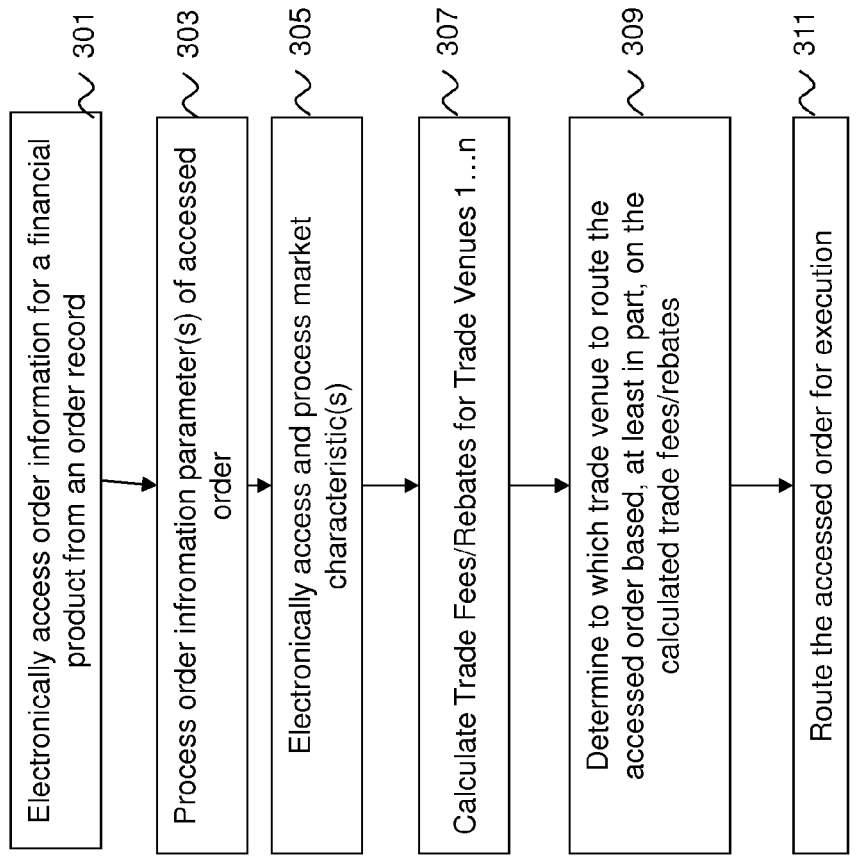
FIG. 3 is a flow diagram of the steps taken by a smart router system to route an order based, at least in part, on a trade fee or rebate calculation of the present invention.

FIG. 3 is a flow diagram of a system process for use in routing orders with a smart routing system. Steps 301 and 303 shown in FIG. 3 are, in most respects, identical to the steps described above with regard to FIG. 2. One difference is that the order information in FIG. 3 is accessed from an order record rather than a trade record, This is because the process of FIG. 3 is taking place before an order has been routed to a trade venue and thus before a trade could occur and a trade record would be generated. Additionally, because this process occurs before execution, some order information parameters would be unavailable. For example, Book Time (i.e., the time that an order is entered into the book of a trade venue) and Execution Time would be unavailable before the submission of an order. According to an embodiment of the present invention, estimated data or historical data could be used to predict data points that are unavailable at the time of processing.

At step 305, market characteristics are electronically accessed and processed. Unlike step 205 described above, which took place at a particular trade venue, step 305 may include the taking in of commercial market data feeds from one or more trade venues. This is necessary because different trade venues may have different market characteristics and these different market characteristics could yield different trade fees and/or rebates. Additionally, it is possible that step 305 could include the accessing and processing of historical market characteristics, in an effort to estimate/predict the state of the market when an order is sent for execution.

At step 307, the smart router calculates the trade fees and/or rebates for the trade venues that it could route the accessed order to (i.e., trade venues 1 . . . n). Because the way that trade fees/rebates are calculated may vary from trade venue to trade venue, the smart router, according to an embodiment of the present invention, may be configured to calculate the trade fees/rebates according to different trade venue dependent trade fee/rebate calculations. According to the present invention, at least one of the trade fee/rebate calculations is based, at least in part, on a non-static market characteristic, e.g., market spread.

At step 309, the smart router determines to which trade venue to route the accessed order. According to an embodiment of the present invention, this determination may be based on a number of factors including, but not limited to, estimated/predicted trade fees/rebates.

At step 311, the smart router routes the accessed order for potential execution based on the determination of step 309.

Trade fees and rebates may be calculated according to the present invention in a number of ways, so long as the calculation uses a non-static market characteristic, e.g., market spread. The following trade fee/rebate structure is an embodiment of the present invention that uses market spread in calculating trade fees and rebates. According to an embodiment of the present invention, the following formulas and tables may be referred to as trade fee variables and rebate variable, depending on which is being calculated.

According to an embodiment of the present invention trade fees are calculated according to the following formula:

Trade Fee=Market Spread*100*Market Participant Rate.

According to various embodiments of the present invention, the multiplier of 100 could be substituted with any value or no value if, for example, the value were one. According to the present embodiment, the multiplier of 100 was used because an options contract has 100 shares of an underlying as its basis. For example, a call option contract for IBM conveys the right to buy 100 shares of IBM at a given strike price. According to another embodiment of the present invention, if the trade fee were being calculated for a stock trade the multiplier may be the number of shares executed.

The market spread is calculated by subtracting the bid from the offer for a financial product at a trade venue or venues. For example, if an option of JJJ stock listed at a trade venue has a bid $5.00 and offer of $5.05, the market spread is $0.05.

According to an embodiment of the present invention, the market participant rate is a predefined percentage set according to the origin code. For example, the following table lists, according to an embodiment of the present invention, the market participant rate.

| Market Participant | Market-Maker | Customer | All Other Origins |
|---|---|---|---|
| Rate | 15% | 17.5% | 20% |

According to other embodiments of the present invention, the rates could be based on one or more different order information parameters. According to other embodiments of the present invention, the rates could be set to different numbers. According to other embodiments of the invention, the rates could be dynamically adjusted according to one or more market characteristics or one or more market participant characteristics. For example, the rates could be adjusted based on a cumulative volume submitted to a trade venue by a market participant, such that the rates would decrease as the market participant's cumulative volume increased. This rate could be formulaic such that any increase in cumulative volume would result in a decrease in the rate. Alternatively, the rate could be decreased upon the cumulative volume reaching or exceeding particular threshold levels.

Turning to the example order discussed above and shown below, the following trade fee calculation could be made. This example assumes that customer "makers" pay a trade fee

| Option Information: | |
|---|---|
| Symbol = IBM | Strike Price = 200 |
| Expiration = Oct. 20, 2012 | Type = Call |
| Order: | Contra-Quote: |
| Side = Buy | Side = Sell |
| Order Price = $5 | User identification = ABC |
| User identification = XYZ | Quote Size = 20 |
| Order Size = 11 | Quote Time = 14:45 |
| Contingency = Day | |
| Origin Code = Customer | |
| Book Time = 14:30 | |
| Execution Information: | |
| Execution Time: 14:45 | Execution Price: $5 |
| Execution Size: 11 | |

According to an embodiment of the present invention, the trade record, which would be accessed to perform the calculation, includes the following order information parameters that are necessary to calculate the trade fee: symbol, expiration, strike price, type, execution size, origin code, book time, and execution time. Utilizing the symbol, expiration, strike price, type, and execution time; the market spread for the specified IBM contract listed at a trade venue can be obtained. For this example, the bid is $10.10 and the offer is $10.15, thus the market spread (which is also a market characteristic) is $0.05.

Next, the market participant rate must be determined. Because the origin code indicates that the order is a customer order, according the present embodiment, a further determination as to whether the order is "maker" or "taker" must be made. This determination could be made in a number of different ways, including by determining if the order has a book time that is earlier than the execution time. As discussed above, if the book time of the order is earlier than the execution time, the order is a "maker". If not the order is a "taker".

Continuing the example, the book time for the accessed order is 14:30 and the execution time is 14:45, thus the accessed order is a "maker" order and is subject to a trade fee. The rate for customer "maker" orders, as set forth in the table above, is 17.5%. Thus, the fee calculation, which yields a trade fee of $0.88, is as follows:

$$\$0.0*100*17.5\%=\$0.88.$$

According to an embodiment of the present invention rebates are calculated according to the following formula:

$$Rebate=Market\ Spread*100*Rebate\ Rate.$$

According to various embodiments of the present invention, the multiplier of 100 could be substituted with any value or no value if, for example, the value were one. According to the present embodiment, the multiplier of 100 was used because an options contract has 100 shares of an underlying as its basis. For example, a call option contract for IBM conveys the right to buy 100 shares of IBM at a given strike price. According to another embodiment of the present invention, if the rebate were being calculated for a stock trade the multiplier may be the number of shares executed.

For this example, the customer order, shown above, will be assumed to be a "taker" order and thus would receive a rebate. The market spread is identical to the market spread stated above. According to an embodiment of the present invention, the order size rate is a predefined percentage set according to an orders size. For example, the following table lists, according to an embodiment of the present invention, order size rate.

| Number of contracts in order | Rebate Rate |
|---|---|
| 1-10 | 20% |
| 11-99 | 15% |
| 100-250 | 10% |
| 251+ | 5% |

According to other embodiments of the present invention, the order size rate could be based on one or more different order information parameters. According to other embodiments of the present invention, the order size rate could be set to different numbers. According to other embodiments of the invention, the order size rate could be dynamically adjusted according to one or more market characteristics or one or more market participant characteristics.

Continuing the example, the accessed order had a size of 11, which corresponds to the 15% order size multiplier. Thus, the rebate calculation, which yields a rebates of $0.75, is as follows:

$$\$0.05*100*15\%=\$0.75.$$

According to an embodiment of the present invention, a maximum trade fee may be set, such that if the calculated trade fee exceeded the maximum only the maximum trade fee would be charged for the order execution. For example, if a maximum trade fee was set to $0.80 per contract, the trade fee of $0.88 calculated above would be reduced to $0.80. The maximum trade fee can be a static number set for all market participants and all orders, or the maximum trade fee could be a dynamic number that may be set according to one or more market characteristics or one or more market participant characteristics. For example, a maximum trade fee could be reduced as the cumulative trade fees paid by a market participant increased. According to an embodiment of the present invention, the degree to which the maximum trade fee is exceeded could be used in determining the fee that should be charged.

According to an embodiment of the present invention, a maximum rebate may be set, such that if the calculated rebate exceeded the maximum only the maximum rebate would be given. For example, if a maximum rebate was set to $0.60 per contract, the rebate of $0.75 calculated above would be reduced to $0.60. Alternatively, the maximum rebate could be set to a calculated rebate that assumes that the market spread is a particular amount, e.g., $3. In another embodiment of the present invention, the maximum rebate could be set to a lesser of a fixed number (e.g., $0.60) and a calculated rebate that assumes that the market spread is a particular amount, e.g., $3.

The maximum rebate can be a static number set for all market participants and all orders, or the maximum rebate could be a dynamic number that may be set according to one or more market characteristics or one or more market participant characteristics. For example, a maximum rebate could be increased as the cumulative trade fees paid by a market participant increased. According to an embodiment of the present invention, the degree to which the maximum rebate is exceeded could be used in determining the rebate that should be given.

Figure 4:
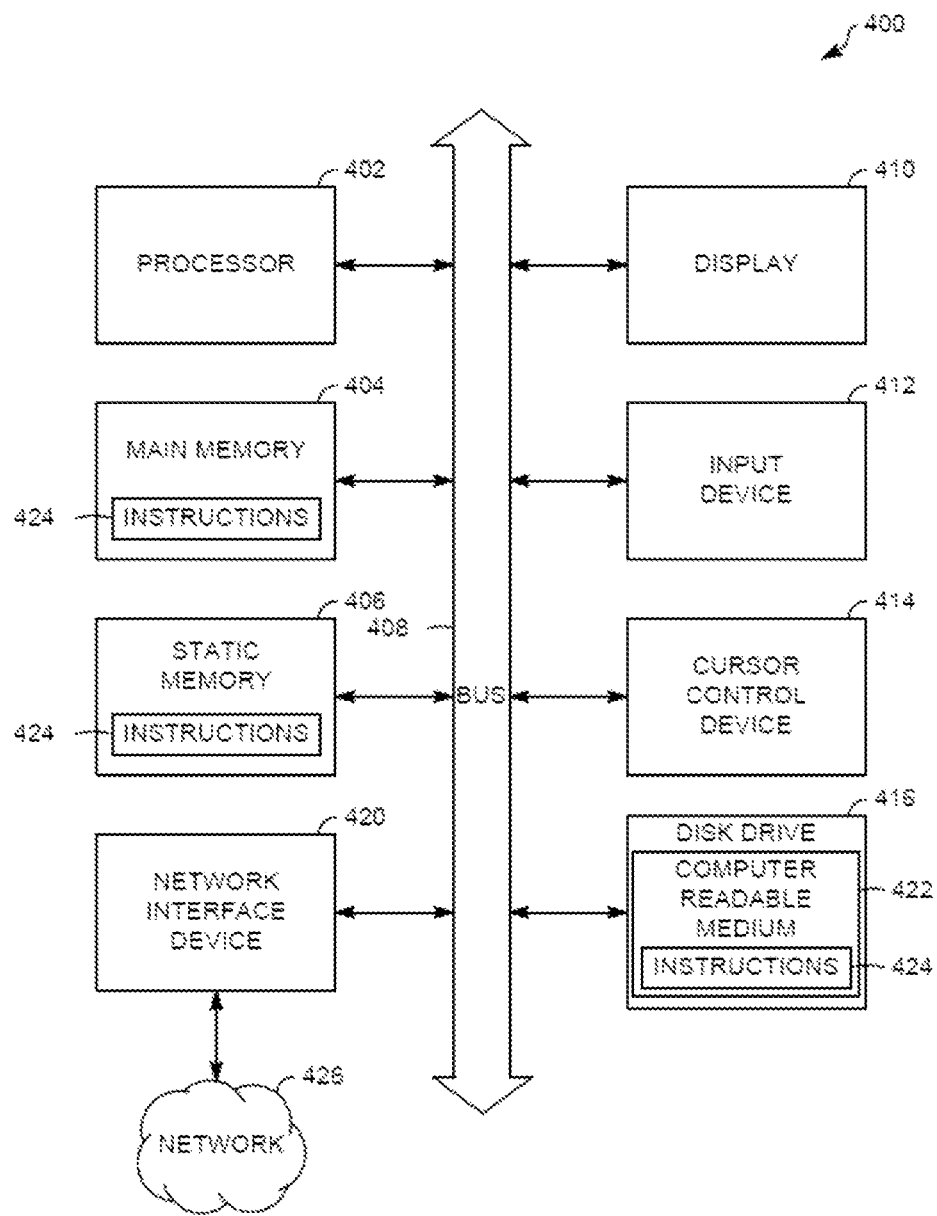
FIG. 4 is a schematic of an exemplary general computer system.

Referring to FIG. 4, an illustrative embodiment of a general computer system that may be used for one or more of the components shown in FIG. 1, or in any other trading system configured to carry out the methods discussed above, is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g., software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by investment management companies, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is intended that the foregoing detailed description be regarded as illustrative rather than limiting, and that it be understood that it is the following claims, including all equivalents, that are intended to define the spirit and scope of this invention.

The invention claimed is:

1. A computer-implemented method for calculating dynamic trade fees, the method comprising the following steps:

accessing, by a computer, order information having order information parameters;

storing, by the computer, one or more of the order information parameters in memory;

accessing, by the computer, a market spread based on the order information parameters;

storing, by the computer, the market spread in memory, wherein the market spread comprises one of a plurality of market characteristics;

accessing, by the computer, one or more electronic databases containing trade fee calculation variables;

storing, by the computer, one or more of the trade fee calculation variables in memory; and calculating, by the computer, a trade fee based on at least one of the trade fee calculation variables stored in memory, the at least one of the trade fee calculation variables comprising a trade fee calculation formula of:

$$\text{Trade Fee} = \text{market spread} * X * \text{market participant rate},$$
where X is a numerical value.

2. The computer-implemented method of claim 1, wherein the one or more order information parameters comprises at least one of: symbol, strike price, expiration, type, side, order size, order price, contingency, user identification, origin code, execution time, execution size, execution price or book time.

3. The computer-implemented method of claim 1, wherein the computer comprises multiple computers in electronic communication with each other via an electronic communications network.

4. The computer-implemented method of claim 1, further comprising transmitting the trade fee to a database, a billing system, or a market participant.

5. The computer-implemented method of claim 1, further comprising:
   accessing, by the computer, one or more of the plurality of market characteristics in addition to the market spread; and
   storing, by the computer, one or more of the one or more market characteristics in the at least one memory.

6. The computer-implemented method of claim 5, wherein the plurality of market characteristics further comprises at least one of: bid and ask, last price, order volume, volatility, or market direction.

7. A system for calculating dynamic trade fees, the system comprising:
   at least one memory, the at least one memory containing instructions for calculating a dynamic trade fee; and
   a processor in communication with the at least one memory, the processor configured to execute the instructions to:
      access order information having order information parameters;
      store one or more of the order information parameters in the at least one memory;
      access a market spread based on the order information parameters;
      store the market spread in the at least one memory, wherein the market spread comprises one of a plurality of market characteristics;
      access one or more electronic databases containing trade fee calculation variables;
      store one or more trade fee calculation variables in memory; and
      calculate a trade fee based on at least a trade fee calculation variable comprising a trade fee calculation formula of:

Trade Fee=market spread*$X$*market participant rate,
   where X is a numerical value.

8. The system of claim 7, wherein the one or more order information parameters comprises at least one of: symbol, strike price, expiration, type, side, order size, order price, contingency, user identification, origin code, execution time, execution size, execution price or book time.

9. The system of claim 7, wherein the processor is further configured to execute the instructions to transmit the trade fee to a database, a billing system, or a market participant.

10. The system of claim 7, wherein the processor is further configured to execute the instructions to:
    access one or more market characteristics in addition to the market spread; and
    store one or more of the one or more market characteristics in the at least one memory.

11. The system of claim 10, wherein the plurality of market characteristics further comprises at least one of: bid and ask, last price, order volume, volatility, or market direction.

* * * * *